(12) United States Patent
Chen

(10) Patent No.: US 10,279,904 B2
(45) Date of Patent: May 7, 2019

(54) FIXED STRUCTURE TYPE VERTICAL TAKE-OFF AND LANDING AIRCRAFT BASED ON DUAL FLYING CONTROL SYSTEMS AND CONTROL METHOD THEREFOR

(71) Applicant: Jiangsu Digital Eagle Technology Co., Ltd., Wuxi (CN)

(72) Inventor: Lechun Chen, Wuxi (CN)

(73) Assignee: JIANGSU DIGITAL EAGLE TECHNOLOGY CO., LTD., Wuxi (CN)

( * ) Notice: Subject to any disclaimer, the term of this patent is extended or adjusted under 35 U.S.C. 154(b) by 155 days.

(21) Appl. No.: 15/322,123

(22) PCT Filed: May 13, 2016

(86) PCT No.: PCT/CN2016/081978
§ 371 (c)(1),
(2) Date: Dec. 26, 2016

(87) PCT Pub. No.: WO2016/184358
PCT Pub. Date: Nov. 24, 2016

(65) Prior Publication Data
US 2017/0158325 A1 Jun. 8, 2017

(30) Foreign Application Priority Data
May 19, 2015 (CN) .......................... 2015 1 0257836

(51) Int. Cl.
B64C 29/02 (2006.01)
B64C 1/00 (2006.01)
(Continued)

(52) U.S. Cl.
CPC ................ *B64C 29/02* (2013.01); *B64C 1/00* (2013.01); *B64C 27/22* (2013.01); *G05D 1/0858* (2013.01);
(Continued)

(58) Field of Classification Search
None
See application file for complete search history.

(56) References Cited

U.S. PATENT DOCUMENTS 5,404,305 A 4/1995 Stiles, Jr.
5,797,105 A 8/1998 Nakaya et al.
(Continued)

FOREIGN PATENT DOCUMENTS

CN 202728575 U 2/2013
CN 103043212 A 4/2013
(Continued)

*Primary Examiner* — Mussa A Shaawat
*Assistant Examiner* — Abdhesh K Jha
(74) *Attorney, Agent, or Firm* — Gokalp Bayramoglu

(57) ABSTRACT

The present invention discloses a fixed-structure vertical takeoff and landing aircraft based on the two flight control systems. The aircraft comprises an aircraft structure and the flight control systems. The aircraft structure comprises a fuselage, fixed wings, a steering engine system and a plurality of engines installed on the peripheral side of the fuselage or the ends of the fixed wings. The flight control systems include the multi-rotor flight control system and the fixed-wing flight control system which are relatively independent or integrated in the same flight control system. Free switching between a multi-rotor vertical takeoff and landing mode and a fixed-rotor high-speed cruising mode is achieved by controlling opening and closing of output channels of the multi-rotor flight control system and the fixed-wing flight control system relative to the steering engine system and the engines through a computer.

7 Claims, 4 Drawing Sheets

(51) Int. Cl.
    *B64C 27/22*   (2006.01)
    *B64C 9/00*    (2006.01)
    *G05D 1/08*    (2006.01)
    *B64C 5/02*    (2006.01)

(52) U.S. Cl.
    CPC .................................. *B64C 5/02* (2013.01);
           *B64C 9/00* (2013.01); *B64C 2009/005*
                                        (2013.01)

(56) References Cited

U.S. PATENT DOCUMENTS

| | | | |
|---|---|---|---|
| 7,159,817 | B2 | 1/2007 | Vandermey |
| 9,834,305 | B2* | 12/2017 | Taylor ................... B64C 39/024 |
| 2005/0178879 | A1* | 8/2005 | Mao ........................ B64C 29/02 |
| | | | 244/7 B |
| 2015/0014475 | A1* | 1/2015 | Taylor ................... B64C 39/024 |
| | | | 244/6 |
| 2015/0225071 | A1* | 8/2015 | Tighe ..................... B64C 29/02 |
| | | | 244/12.4 |
| 2017/0177006 | A1* | 6/2017 | Fisher ................... G06Q 10/08 |

FOREIGN PATENT DOCUMENTS

| | | |
|---|---|---|
| CN | 104816824 A | 8/2015 |
| CN | 204701764 U | 10/2015 |

* cited by examiner

FIXED STRUCTURE TYPE VERTICAL TAKE-OFF AND LANDING AIRCRAFT BASED ON DUAL FLYING CONTROL SYSTEMS AND CONTROL METHOD THEREFOR

CROSS REFERENCE TO RELATED APPLICATIONS

This application is the national phase entry of International Application No. PCT/CN2016/081978, filed on May 13, 2016, which is based upon and claims priority to Chinese Patent Application No. 201510257836.4, filed on May 19, 2015, the entire contents of which are incorporated herein by reference.

BACKGROUND OF THE INVENTION

Technical Field

The present invention relates to the field of design of aviation aircrafts, in particular to a fixed-structure vertical takeoff and landing aircraft based on two flight control systems, and a corresponding control method.

Description of Related Art

A fixed-wing aircraft has the advantages of being high in flight efficiency and speed, long in distance, simple in system structure, low in weight, low in cost and usage fee and the like, however, a fixed-wing aircraft also has the inevitable defect that a ground sliding or a special launching and recovering device is needed during takeoff and landing. Particularly for small fixed-wing unmanned aircrafts, conventional small fixed-wing unmanned aircrafts which can only take off and land through ground sliding are seriously limited by urban high-rise buildings.

A multi-rotor aircraft has the vertical takeoff and landing capacity, can take off and land on an urban vacant lot and can easily shuttle back and forth between buildings, thereby being capable of better adapt to urban airspace. However, the efficiency of rotors, directly connected with a power system, of the multi-rotor aircraft is far inferior to that of rotors of the fixed-wing aircraft, and therefore, power consumption is large. The advancing speed of the multi-rotor aircraft is achieved mainly by a rotor disc through the component force generated by inclination of a swash plate, and the forward flight resistance is much larger than that of the fixed-wing aircraft. The flight speed, flight distance and flight duration of the multi-rotor aircraft are all inferior to those of the fixed-wing aircraft. For this reason, technicians in the aviation field are looking for an aircraft which has the performance and advantages of the fixed-wing aircraft as well as the performance and advantages of the multi-rotor aircraft all the time.

A current common vertical takeoff and landing and fixed wing scheme is mainly composed of an engine inclining type. According to the scheme, lift engines and cruising engines are combined, and the engines are inclined during flight state switching through a mechanical variable-shaft structure, so that the thrust direction of the engines is made to rotate around the horizontal axis of a fuselage, and the fuselage is kept basically horizontal during flight. However, the positions of the engines on an aircraft are seriously limited by inclining the engines, both the positions of wings and the positions of the engine have to be consistent with the center of gravity of the aircraft, and once part of the lift engines break down or instant output is insufficient, disastrous accidents can be easily caused by asymmetric lift force. Furthermore, the engines are extremely heavy, thereby being difficult to incline. Consequentially, the existing scheme has the defect that a thrust converting mechanism or a power device is complex, and accessories are heavy, and is not beneficial for lightweight and miniaturization of the aircraft and improvement of the flight efficiency.

SUMMARY OF THE INVENTION

For solving above problems, the present invention provides a fixed-structure vertical takeoff and landing aircraft based on two flight control systems and a control method thereof according to which the complexity of the aircraft can be reduced, both the multi-rotor vertical takeoff and landing characteristic and the fixed-wing high-speed cruising characteristic are achieved, free switching between the two flight modes can be achieved, the structure is simple, control is flexible, and the performance is reliable.

The technical schemes of the present invention are as follows:

A fixed-structure vertical takeoff and landing aircraft based on two flight control systems comprises an aircraft structure and the flight control systems;

the aircraft structure is a conventional structure or a flying swing structure or a V-tail structure and comprises a fuselage, fixed wings arranged on the fuselage, and a primary flight control system installed on the fixed wings; a plurality of engines are connected to the peripheral side of the fuselage or the ends of the fixed wings, and the engines are internal combustion engines or motors or jet engines or rocket engines;

the flight control systems are installed in the aircraft structure and comprises the multi-rotor flight control system and the fixed-wing flight control system, wherein a plurality of output channels of the multi-rotor flight control system are connected with the engines correspondingly, output channels of the fixed-wing flight control system include a plurality of primary flight control system control channels and a throttle control channel, the primary flight control system control channels are connected with the ailerons, the elevators, the elevons, and the rudders correspondingly, and the throttle control channel is connected with the engines; both the multi-rotor flight control system and the fixed-wing flight control system are connected with a manual control module, a power source and a global positioning system (GPS) module, and the fixed-wing flight control system is connected with an airspeed meter; the GPS module is connected with a computer; the computer and the manual control module are connected with the output channels of the multi-rotor flight control system and the fixed-wing flight control system and control opening and closing of the output channels of the multi-rotor flight control system and the fixed-wing flight control system through an on-off switch.

According to a further technical scheme of the present invention, the multi-rotor flight control system and the fixed-wing flight control system are relatively independent or are integrated in one flight control system.

According to a further technical scheme of the present invention, the engines are of the same type, the number of the engines is three or more, and the common center of gravity of all the engines in the vertical direction coincides with the center of gravity of the aircraft fuselage and the center of gravity of the fixed-wing structure.

According to a further technical scheme of the present invention, supporting rods are installed at the tails of all the engines correspondingly.

According to a further technical scheme of the present invention, the aircraft is of a conventional structure and comprises a fuselage, wherein wings are arranged in the middle of the fuselage, and horizontal tail wings and vertical tail wings are arranged at the tail of the fuselage; movable ailerons are installed on the rear edges of the wings, movable elevators are installed on the rear edges of the horizontal tail wings, and movable rudders are installed on the rear edges of the vertical tail wings; a plurality of engines are connected to the peripheral side of the fuselage through a plurality of connecting rods, and supporting rods are installed at the tails of the engines correspondingly.

According to a further technical scheme of the present invention, the aircraft is of a flying-wing structure and comprises a fuselage, wherein a pair of horizontal wings are arranged on the left side and the right side of the fuselage, a pair of vertical wings are arranged on the upper side and the lower side of the fuselage, and the wingspan length of the horizontal wings is larger than the wingspan length of the vertical wings; movable elevons formed by combining elevators with ailerons are installed on the rear edges of the horizontal wings, movable rudders are installed on the rear edges of the vertical wings, engines are installed on the wingtips of the horizontal wings and the vertical wings correspondingly, and supporting rods are installed at the tails of the engines correspondingly.

The present invention further provides a control method of the fixed-structure vertical takeoff and landing aircraft based on the two flight control systems.

The aircraft has a manual flight mode and an automatic fight mode, and when the aircraft is in the automatic flight mode:

In the takeoff stage, the aircraft is at a vertical takeoff and landing posture with the head of the aircraft facing upwards, the on-off switch is controlled by the computer or manually to open the output channels of the multi-rotor flight control system and close the output channels of the fixed-wing flight control system at the same time, the multi-rotor flight control system controls the engines to work, and the gravity is overcome by lift force generated through rotation of the engines, so that the flight altitude of the aircraft is increased gradually, and adjustment of the flight posture and the climbing speed of the aircraft in the takeoff process is achieved by controlling the output power of the engines;

in the high-altitude flight stage, when the GPS module installed in the aircraft detects that the aircraft reaches a specified safe flight altitude or reaches a specified travel point, the on-off switch is controlled by the computer or manually to close the output channels of the multi-rotor flight control system and open the output channels of the fixed-wing flight control system at the same time, and the fixed-wing flight control system controls the primary flight control system installed on the fixed wings to work, so that the aircraft is changed to the level flight posture from the vertical takeoff and landing posture, adjustment of the level flight posture is achieved by controlling the primary flight control system, and meanwhile adjustment of the flight speed is achieved by controlling the output power of the engines;

in the landing stage, when the GPS module installed in the aircraft detects that the aircraft reaches a specified safe flight altitude or reaches a specified travel point, the on-off switch is controlled by the computer or manually to open the output channels of the multi-rotor flight control system and close the output channels of the fixed-wing flight control system at the same time, the multi-rotor flight control system controls the engines to work, the aircraft is changed to the vertical takeoff and landing posture from the level flight posture by controlling the output power of the engines, and the flight altitude of the aircraft is decreased gradually by overcoming the gravity through lift force generated through rotation of the engines till the aircraft lands safely; during this period, adjustment of the flight posture and the landing speed of the aircraft in the landing process is achieved by controlling the output power of the engines.

The present invention has the beneficial effects that:

The aircraft of the present invention has the advantages of the fixed-wing aircraft as well as the advantages of the multi-rotor aircraft, can be freely switched between the two flight modes, and can vertically take off and land in a multi-rotor mode and cruise at a high speed in a fixed-wing mode. No special mechanical variable-shaft structure is needed, the structure is simple, the reliability is high, control is flexible, and the cost is low.

The two flight control systems are adopted by the present invention and are both mature techniques, and compared with the approach of developing a novel flight control system for achieving control over the fixed-wing aircraft and the multi-rotor aircraft, the development cost and the development risk can be reduced. The two flight control systems are more convenient to use on the aspect of the control principle, no complex mechanical variable-shaft structure is needed, and the load and equipment arrangement in the aircraft are not affected.

The present invention is not only suitable for unmanned aircrafts but also suitable for manned aircrafts, and can be widely applied to the fields of civil aviation, military and the like.

Figure 1:
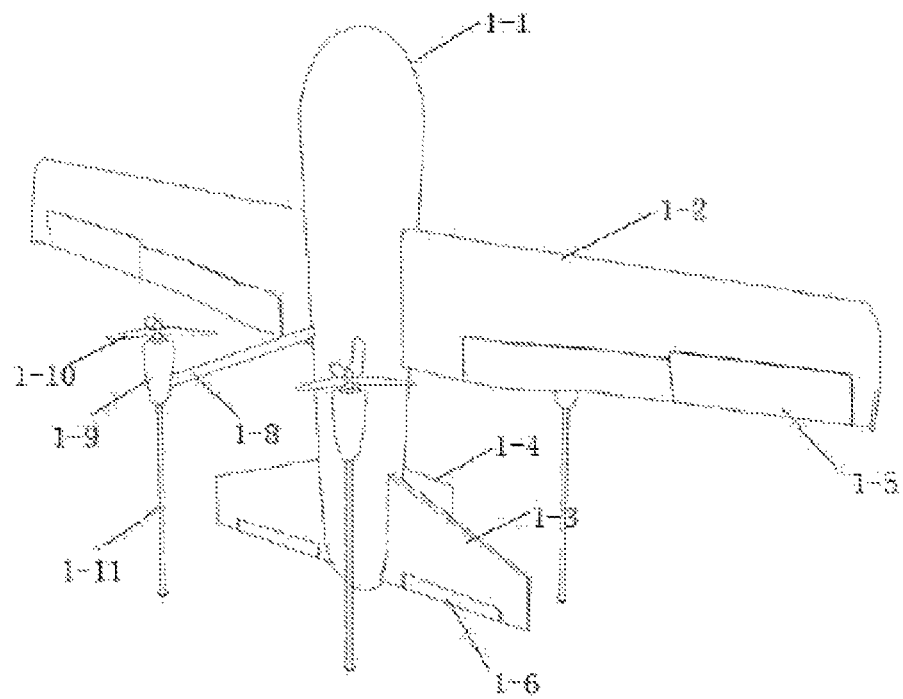
FIG. 1 is a space diagram of a first embodiment of an aircraft structure of the present invention.
Figure 2:
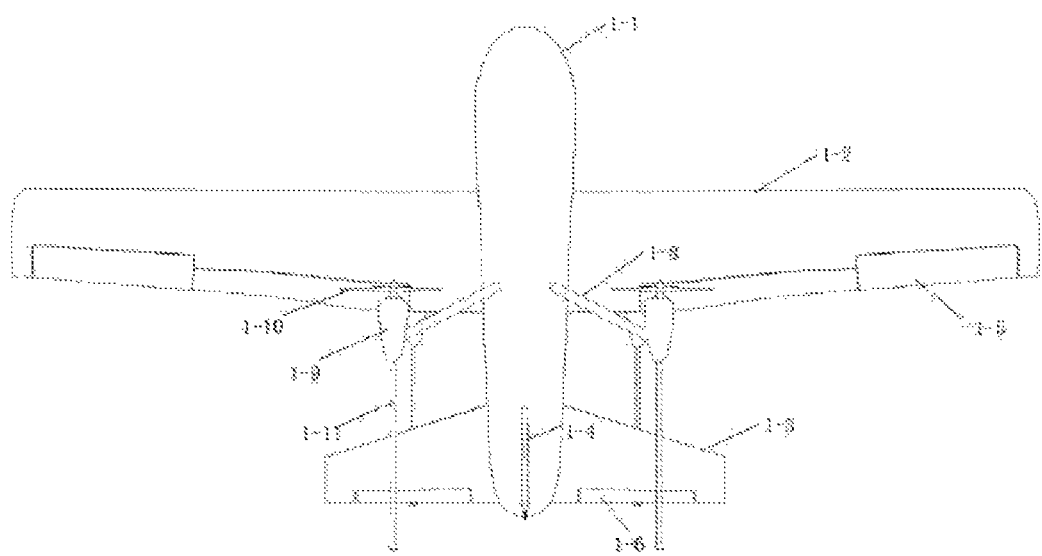
FIG. 2 is a front view of the first embodiment of the aircraft structure of the present invention.
Figure 3:
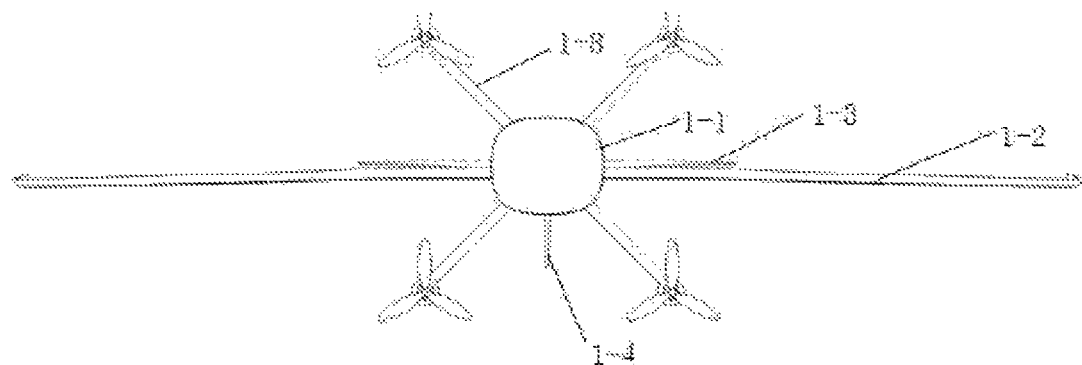
FIG. 3 is a top view of the first embodiment of the aircraft structure of the present invention.
Figure 4:
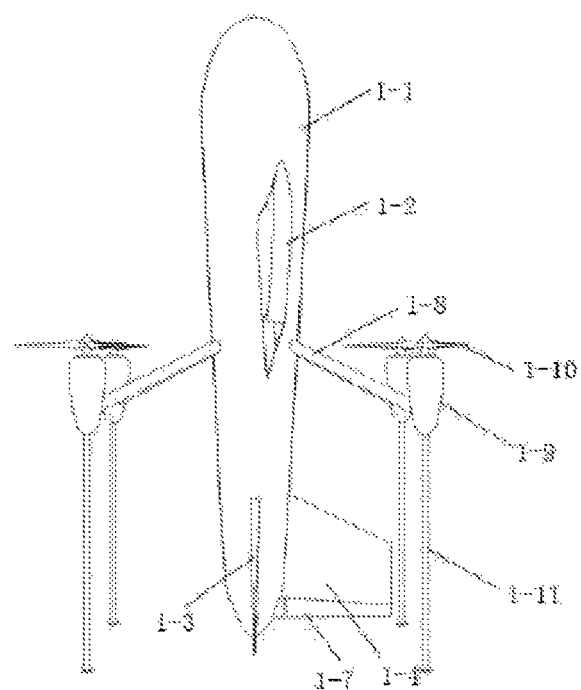
FIG. 4 is a left view of the first embodiment of the aircraft structure of the present invention.

Description of marks in the drawings: 1-1. fuselage; 1-2. wing; 1-3. horizontal tail wing; 1-4. vertical tail wing; 1-5. aileron; 1-6. elevator; 1-7. rudder; 1-8. connecting rod; 1-9. engine; 1-10. propeller; 1-11. supporting rod; 2-1. fuselage; 2-2. horizontal wing; 2-3. vertical wing; 2-4. elevon; 2-5. rudder; 2-6. engine; 2-7. propeller; 2-8. supporting rod; 1. multi-rotor flight control system; 2. fixed-rotor flight control system; 3. engine; 4. primary flight control system; 5. power source; 6. GPS module; 7. airspeed meter; 8. computer; 9. on-off switch; 10. manual control module.

DETAILED DESCRIPTION OF THE INVENTION

A further description of the specific execution modes of the present invention is given with accompanying drawings as follows.

Embodiment I

FIGS. 1-4 show an embodiment of an aircraft of a conventional structure of the present invention. As is show in FIGS. 1-4, in the embodiment, the aircraft structure comprises a fuselage 1-1, wherein a pair of wings 2-2 are arranged in the middle of the fuselage 1-1, and a pair of horizontal tail wings 1-3 and a pair of vertical tail wings 1-4 are arranged at the tail of the fuselage 1-1. Movable ailerons 1-5 are installed on the rear edges of the wings 2-2 correspondingly. Movable elevators 1-6 are installed on the rear edges of the horizontal tail wings 1-3 correspondingly. Movable rudders 1-7 are installed on the rear edges of the vertical tail wings 1-4 correspondingly. Four engines 1-9 of the same type are connected to the fuselage 1-1 through four connecting rods 1-8 correspondingly, propellers 1-10 are installed on the engines 1-9, rotors are formed by the engines 1-9 and the propellers 1-10, and supporting rods 1-11 are installed at the tails of the engines 1-9 and used for keeping the aircraft stable when the aircraft lands.

Embodiment II

Figure 5:
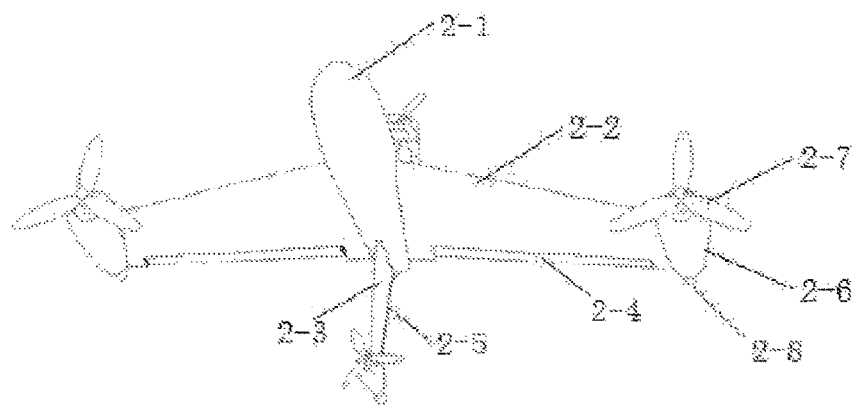
FIG. 5 is a space diagram of a second embodiment of the aircraft structure of the present invention.
Figure 6:
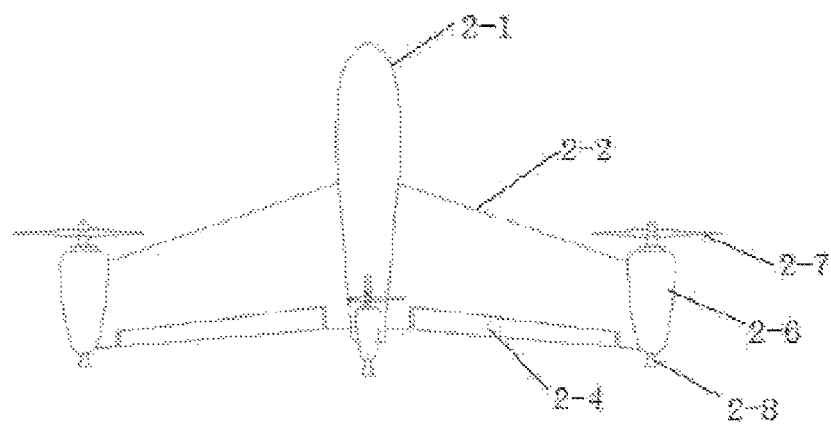
FIG. 6 is a front view of the second embodiment of the aircraft structure of the present invention.
Figure 7:
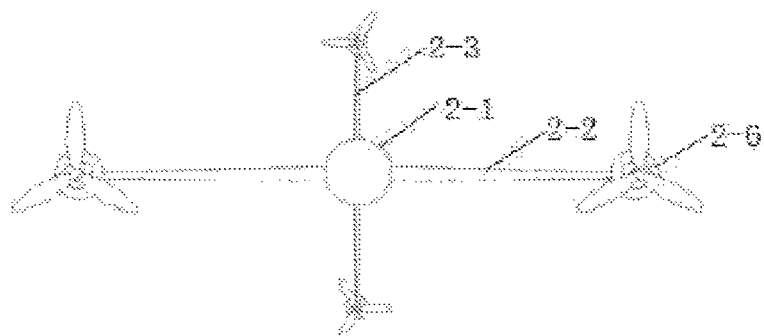
FIG. 7 is a top view of the second embodiment of the aircraft structure of the present invention.

FIGS. 5-7 show an embodiment of the aircraft of a flying-wing structure of the present invention. As is shown in FIGS. 5-7, in the embodiment, the aircraft structure comprises a fuselage 2-1, wherein a pair of horizontal wings 2-2 are arranged on the left side and the right side of the fuselage 2-1, a pair of vertical wings 2-3 are arranged on the upper side and the lower side of the fuselage 2-1, and the wingspan length of the horizontal wings 2-2 is larger than the wingspan length of the vertical wings 2-3. Movable elevons 2-4 which have the function of elevators and the function of ailerons are installed on the rear edges of the horizontal wings 2-2 correspondingly. Movable rudders 2-5 are installed on the rear edges of the vertical wings 2-3 correspondingly. Engines 2-6 of the same type are installed on the wingtips of the horizontal wings 2-2 and the vertical wings 2-3 correspondingly, propellers 2-7 are installed on the engines 2-6, rotors are formed by the engines 2-6 and the propellers 2-7, and supporting rods 2-8 are installed at the tails of the engines 2-6 and used for keeping the aircraft stable when the aircraft lands.

PS: the types, number and installation positions of the engines shown in the accompanying drawings of the two embodiments are only for reference and do not limit the present invention.

Figure 8:
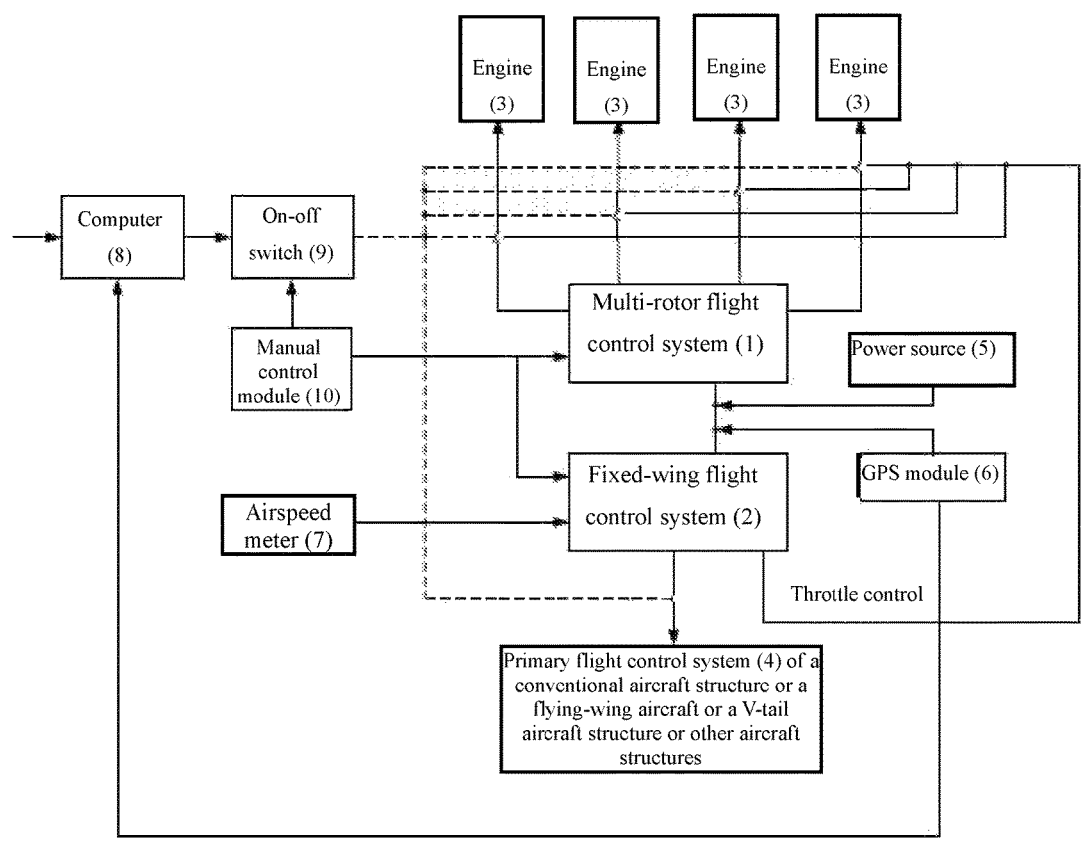
FIG. 8 is a schematic diagram of flight control systems of the present invention.

FIG. 8 is the schematic diagram of the flight control systems of the present invention. As is shown in FIG. 8, the two flight control systems are installed in the aircraft structure and include the multi-rotor flight control system 1 and the fixed-wing flight control system 2. The multi-rotor flight control system 1 and the fixed-wing flight control system 2 can be relatively independent and can also be integrated in the same flight control system. A plurality of output channels of the multi-rotor flight control system 1 are connected with and control the four engines 3 in the first embodiment or the second embodiment correspondingly. Output channels of the fixed-wing flight control system 2 include a plurality of primary flight control system control channels and a throttle control channel. The multiple primary flight control system control channels are connected with and control a primary flight control system 4 composed of ailerons, elevators, elevons, rudders and the like of various aircraft structures such as the conventional structure, the flying-wing structure and the V-tail structure. The throttle control channel is a single channel, is connected with the four engines 3 in the first embodiment or the second embodiment and controls the four engines 3 in a unified mode. A power source 5 is connected with the multi-rotor flight control system 1 and the fixed-wing flight control system 2 and supplies power to the multi-rotor flight control system 1 and the fixed-wing flight control system 2. A GPS module 6 is connected with the multi-rotor flight control system 1 and the fixed-wing flight control system 2 and provides flight position and altitude data serving as the control basis. An airspeed meter 7 is connected with the fixed-wing flight control system 2 and provides airspeed data serving as the control basis at the level flight posture. An on-off switch 9 is connected with the output channels of the multi-rotor flight control system 1 and the fixed-wing flight control system 2 and controls opening and closing of the output channels of the multi-rotor flight control system 1 and the fixed-wing flight control system 2. A manual control module 10 is connected with the on-off switch 9, the multi-rotor flight control system 1 and the fixed-wing flight control system 2 and provides a control command. The control command of the on-off switch 9 is provided by a computer 8 or the manual control module 10. The control basis of the computer 8 is provided by the GPS module 6.

A flight control method of the aircraft based on the two flight control systems of the present invention is as follows.

The aircraft mainly include three kinds of motions when flying in the air, namely leftward and rightward inclination (controlled by the ailerons), up-down lifting (controlled by the elevators) and leftward and rightward deflection (controlled by the rudders). The ailerons form the main operation plane of the aircraft, the rolling moment generated by controlling the left aileron and the right aileron to deflect in a differential mode can make the aircraft to roll transversely, the wingspan is long, and the wing chord is short. The elevators are controllable wing surface parts in the horizontal wings and used for pitching control over the aircraft. When the aircraft needs to be controlled to look up or down, the elevators in the horizontal wings can come into effect. In the aircraft of the flying-wing structure, the elevators and the ailerons are combined to form the elevons. If the two elevons deflect in the same direction, the aircraft can rise or fall; if the two elevons deflect in opposite directions, the aircraft can roll leftwards and rightwards. Since the control force arm of the elevons is smaller than that of an aircraft of a normal structure when the elevons are used as the elevators, the areas of the elevons have to be designed to be large. The rudders are used for correcting the flight direction and steering angle of the aircraft and are movable wing surface parts which are installed on the vertical wings and used for achieving control over the flight direction of the aircraft. The rudders are mostly used for small-angle steering, and for completing large-angle steering, the aircraft needs to be made to incline and deflect through the ailerons to generate centrifugal force, and the fuselage needs to be made to look down and up through the ailerons.

In the whole flight process of the aircraft of the present invention, the multi-rotor flight control system 1 and the fixed-wing flight control system 2 work all the time, and what is switched is the opening-closing state of the output channels between the two flight control systems and a controlled target.

In the takeoff stage, the aircraft is at a vertical takeoff and landing posture with the head of the aircraft facing upwards and the supporting rods on the tail making contact with the ground, the on-off switch 9 is controlled by the computer 8 to open the output channels of the multi-rotor flight control system 1 and close the output channels of the fixed-wing flight control system 2 at the same time (PS: the process can also be controlled through the manual control module 10). At the moment, the multi-rotor flight control system 1 controls the engines 3 to work, and the engines 3 drive the propellers to rotate to generate lift force to overcome the gravity, so that the flight altitude of the aircraft is increased gradually. In the stage, the multi-rotor flight control system 1 controls the output power of the engines 3 to form a lift force difference or a torque difference, so that adjustment of the flight posture of the aircraft in the takeoff process is achieved; the output power of the engines 3 is adjusted, so that adjustment of the climbing speed of the aircraft is achieved.

In the high-altitude flight stage, when the GPS module 6 detects that the aircraft reaches a specified safe level-flight altitude or reaches a specified level-flight travel point, the on-off switch 9 is controlled by the computer 8 to close the output channels of the multi-rotor flight control system 1 and open the output channels of the fixed-wing flight control system 2 at the same time (PS: the process can also be controlled though the manual control module 10). At the moment, the fixed-wing flight control system 2 controls the primary flight control system 4 comprising the ailerons, the elevators and the rudders to work to adjust the flight posture, so that the aircraft is changed to the level flight posture from the vertical takeoff and landing posture. In the high-altitude flight stage, the fixed-wing flight control system 2 controls the primary flight control system according to data provided by the airspeed meter 7, so that adjustment of the level flight posture is achieved; the output power of the engines 3 is controlled in a unified mode through a throttle, so that adjustment of the flight speed is achieved.

In the landing stage, when the GPS module 10 detects that the aircraft reaches a specified safe landing altitude or reaches a specified landing travel point, the on-off switch 9 is controlled by the computer 8 to open the output channels of the multi-rotor flight control system 1 and close the output channels of the fixed-wing flight control system 2 at the same time (PS: the process can also be controlled through the manual control module 10). At the moment, the multi-rotor flight control system 1 controls the engines 3 to work, and the output power of the engines 3 is controlled to form a lift force difference or a torque difference, so that the aircraft is changed to the vertical takeoff and landing posture from the level flight posture; afterwards, the engines 3 drives the propellers to rotate to generate lift force to overcome the gravity, so that the flight altitude of the aircraft is decreased gradually till the aircraft lands safely. In the stage, the multi-rotor flight control system 1 controls the output power of the engines 3 to form the lift force difference or the torque difference, so that the balanced flight posture of the aircraft in the landing process is guaranteed; the output power of the engines 3 is controlled, so that adjustment of the landing speed of the aircraft in the landing process is achieved.

The foregoing description is only the preferred execution modes of the present invention, and the present invention is not limited to the embodiments. It can be understood that other improvements and changes which are directly derived or thought out by those skilled in the field without deviating from the spirit and conception of the present invention are all included in the protection scope of the present invention.

What is claimed is:

1. A fixed-structure vertical takeoff and landing aircraft based on two flight control systems, wherein the fixed-structure vertical takeoff and landing aircraft comprises an aircraft structure and flight control systems;

the aircraft structure is a conventional structure or a flying-wing structure or a V-tail structure and comprises a fuselage, fixed wings arranged on the fuselage, and a primary flight control system installed on the fixed wings; a plurality of engines are connected to a peripheral side of the fuselage or ends of the fixed wings; the engines are internal combustion engines or motors or jet engines or rocket engines; the primary flight control system comprises ailerons, elevators, elevons, and rudders;

the flight control systems are installed on the aircraft structure and include a multi-rotor flight control system and a fixed-wing flight control system, a plurality of output channels of the multi-rotor flight control system are connected with the engines correspondingly, a plurality of output channels of the fixed-wing flight control system include a plurality of primary flight control system control channels and a throttle control channel, the primary flight control system channels are connected with the ailerons, the elevators, the elevons, and the rudders correspondingly, and the throttle control channel is connected with the engines; both the multi-rotor fight control system and the fixed-wing flight control system are connected with a manual control module, a power source and a GPS module, and the fixed-wing flight control system is connected with an airspeed meter; the GPS module is connected with a computer; the computer and the manual control module are connected with the output channels of the multi-rotor flight control channels and the fixed-wing flight control system and control opening and closing of the output channels of the multi-rotor flight control channels and the fixed-wing flight control system through an on-off switch.

2. The fixed-structure vertical takeoff and landing aircraft based on the two flight control systems according to claim 1, wherein the multi-rotor flight control system and the fixed-wing flight control system are relatively independent or integrated in a same flight control system.

3. The fixed-structure vertical takeoff and landing aircraft based on the two flight control systems according to claim 1, wherein the engines are of a same type, a number of the engine is three or more, and a common center of gravity of all the engines in the vertical direction coincides with the center of gravity of the aircraft fuselage and the center of gravity of the fixed-wing structure.

4. The fixed-structure vertical takeoff and landing aircraft based on the two flight control systems according to claim 1, wherein supporting rods are installed at tails of the engines correspondingly.

5. The fixed-structure vertical takeoff and landing aircraft based on the two flight control systems according to claim 1, wherein the aircraft is of a conventional structure and comprises the fuselage, wings are arranged in a middle of the fuselage, and horizontal tail wings and vertical tail wings are arranged at a tail of the fuselage; movable ailerons are installed on rear edges of the wings, movable elevators are installed on rear edges of the horizontal tail wings, and movable rudders are installed on rear edges of the vertical tail wings; a plurality of engines are connected to the peripheral side of the fuselage through a plurality of connecting rods, and the supporting rods are installed at the tails of the engines correspondingly.

6. The fixed-structure vertical takeoff and landing aircraft based on the two flight control systems according to claim 1, wherein the aircraft is of the flying-wing structure and comprises the fuselage, wherein a pair of horizontal wings are arranged on a left side and a right side of the fuselage, a pair of vertical wings are arranged on an upper side and a lower side of the fuselage, and a wingspan length of the horizontal wings is larger than the wingspan length of the vertical wings; movable elevons formed by combining elevators with ailerons are installed on rear edges of the horizontal wings, movable rudders are installed on rear edges of the vertical wings, engines are installed on wingtips of the horizontal wings and the vertical wings correspondingly, and the supporting rods are installed at the tails of the engines correspondingly.

7. A control method of the fixed-structure vertical takeoff and landing aircraft based on the two flight control systems according to wherein the fixed-structure vertical takeoff and landing aircraft based on two flight control systems including
an aircraft structure and flight control systems;
the aircraft structure is a conventional structure or a flying-wing structure or a V-tail structure and comprises a fuselage, fixed wings arranged on the fuselage, and a primary flight control system installed on the fixed wings; a plurality of engines are connected to a peripheral side of the fuselage or ends of the fixed wings; the engines are internal combustion engines or motors or jet engines or rocket engines; the primary flight control system comprises ailerons, elevators, elevons, and rudders;
the flight control systems are installed on the aircraft structure and include a multi-rotor flight control system and a fixed-wing flight control system, a plurality of output channels of the multi-rotor flight control system are connected with the engines correspondingly, a plurality of output channels of the fixed-wing flight control system include a plurality of primary flight control system control channels and a throttle control channel, the primary flight control system channels are connected with the ailerons, the elevators, the elevons, and the rudders correspondingly, and the throttle control channel is connected with the engines; both the multi-rotor fight control system and the fixed-wing flight control system are connected with a manual control module, a power source and a GPS module, and the fixed-wing flight control system is connected with an airspeed meter; the GPS module is connected with a computer; the computer and the manual control module are connected with the output channels of the multi-rotor flight control channels and the fixed-wing flight control system and control opening and closing of the output channels of the multi-rotor flight control channels and the fixed-wing flight control system through an on-off switch,
wherein the method comprising:
positioning, in a takeoff stage, the aircraft at a vertical takeoff and landing posture with a head of the aircraft facing upwards;
controlling the on-off switch by the computer or manually to open the output channels of the multi-rotor flight control system;
closing the output channels of the fixed-wing flight control system at the same time;
controlling the engines to work by the multi-rotor flight control system;
overcoming the gravity by lift force generated through a rotation of the engines, so that the flight height of the aircraft is increased gradually;
adjusting a flight posture and a climbing speed of the aircraft in a takeoff process by controlling an output power of the engines;
controlling the on-off switch by the computer or manually to close the output channels of the multi-rotor flight control system, in a high-altitude flight stage, when the GPS module installed in the aircraft detects that the aircraft reaches a specified safe flight altitude or reaches a specified travel point;
opening the output channels of the fixed-wing flight control system at the same time;
controlling the primary flight control system installed on the fixed wings to work by the fixed-wing flight control system, so that the aircraft is changed to a level flight posture from the vertical takeoff and landing posture;
adjusting the level flight posture by controlling the primary flight control system;
adjusting a flight speed by controlling the output power of the engines;
controlling the on-off switch by the computer or manually to open the output channels of the multi-rotor flight control system in the landing stage, when the GPS module installed in the aircraft detects that the aircraft reaches the specified safe flight altitude or reaches the specified travel point;
closing the output channels of the fixed-wing flight control system at the same time;
controlling the engines to work by the multi-rotor flight control system;
changing the aircraft to the vertical takeoff and landing posture from the level flight posture by controlling the output power of the engines;
decreasing the flight altitude of the aircraft gradually by overcoming the gravity through lift force generated through the rotation of the engines till the aircraft lands safely;
adjusting the flight posture and the landing speed of the aircraft in the landing process by controlling the output power of the engines in this period.

\* \* \* \* \*